June 14, 1960  S. BOROS  2,940,582
ARTICLE CONVEYOR AND FEEDING MECHANISM
Filed April 18, 1958  3 Sheets-Sheet 3

United States Patent Office 2,940,582
Patented June 14, 1960

2,940,582
ARTICLE CONVEYOR AND FEEDING MECHANISM

Steve Boros, Memphis, Tenn., assignor to General Electric Company, a corporation of New York Filed Apr. 18, 1958, Ser. No. 729,406

8 Claims. (Cl. 198—33)

This invention relates in general to an article conveyor device, and more particularly to a device for conveying stem tube type lamp mounts and other similarly shaped articles successively into and uniformly positioning them in an exact predetermined vertically arranged position.

In present day high-speed production manufacturing operations, such as in the manufacture of electric lamps, it is desirable to provide automatic means for conveying stem type lamp mounts, or other similar type articles, successively into a predetermined position for subsequent operations to be performed thereon. For example, it is desirable to provide an automatically operating lamp mount supplying or feeding mechanism for successively presenting lamp mounts in a predetermined vertically arranged feeding position for the loading thereof into the mount holders on the heads of a conventional indexing type lamp sealing machine. To be effective and satisfactory for such purpose, such automatically operating mount conveyor or feeder mechanism should, among other things, be capable of performing the mount feeding operation at the necessary high speeds with very high efficiency so as to keep the percentage of damaged mounts, which are broken or damaged during the feeding operation, within acceptable production limits. In addition, such automatically operating mount feeding mechanism should be trouble-free and capable of operating satisfactorily for long periods of use without requiring any production delays for repairs or adjustments thereto.

It is an object of my invention, therefore, to provide an article conveying mechanism of simple and inexpensive construction and effective in operation for transporting articles such as stem type lamp mounts and the like, and successively positioning them uniformly in a predetermined vertically arranged position.

Another object of my invention is to provide a lamp mount conveyor mechanism which will transport lamp mounts of the stem tube type and successively position them uniformly in a predetermined vertically arranged position, and which is capable of operating with high efficiency at high speeds and is characterized by relatively low maintenance so as to minimize production delays for repairs or adjustments.

Still another object of my invention is to provide an automatically operating article feeding mechanism of simple and inexpensive construction and trouble-free in operation for intermittently advancing a row of lamp mounts of the stem tube type, and successively positioning the foremost mount in a predetermined vertically arranged feeding position for loading into one of the heads of a lamp sealing machine.

Briefly stated, in accordance with one aspect of the invention, the conveyor is comprised of a mount supporting track in the form of a pair of horizontally disposed spaced parallel rails along which the lamp mounts are progressively advanced in step-by-step fashion, in a vertically upright position thereon, by a reciprocating shuttle member which intermittently engages the mounts on the track and slides or pushes them therealong to their successive advanced positions on the track. According to a further aspect of the invention, locking means are provided for intermittently engaging and positively holding each of the mounts in their advanced position on the track, following each advance movement of the mounts and during the ensuing period of disengagement of the mount-advancing shuttle member with the mounts on the track. The conveyor is preferably provided, in addition, with mount orienting means in the form of a guide bar extending longitudinally of the conveyor track and engageable with one of the flat sides of the flattened stem press portion of the mount stem or flare tube, during the advance movement of the mounts along the conveyor track, to properly orient the mounts into a predetermined position on the conveyor track and maintain them in the said oriented position throughout their advance movement therealong.

Further objects and advantages of my invention will appear from the following detailed description of a species thereof and from the accompanying drawing.

Referring to the drawing, the invention is there illustrated as embodied in a device for automatically transporting lamp mounts such as are customarily employed for incandescent lamps, successively into a predetermined vertically arranged position for loading into the mount holders of a lamp sealing machine. The particular form of lamp mount 1 which the conveyor mechanism according to the invention is adapted to transport is of the stem or flare tube type comprising a glass flare or stem tube 2 (Fig. 6) having a flared end 3 and provided at its other end with a flattened stem press portion 4 in which are sealed a pair of leading-in wires 5 having outer lead portions 6 which extend through the flare tube 2 and outwardly beyond the flared end 3 thereof. The leading-in wires 5 are also provided with inner lead portions 7 which extend endwise from the press portion 4 of the flare tube 2 and are electrically connected to and support a filament 8 such as a coiled tungsten wire, for example. A glass exhaust tube 9 is fusion-sealed to the stem press portion 4 of the flare tube 2 and extends approximately concentrically therethrough and outwardly beyond the flared end 3 of the flare tube.

In accordance with the illustrated embodiment of the invention, the lamp mounts 1 are carried on an indexing chain-type conveyor A, in a vertical filament down position thereon, to a mount turn-over device B which then transfers and inverts the mounts onto a reciprocating rack-type conveyor and loading mechanism C according to the invention. The lamp mounts 1 are advanced by the rack conveyor C one position at a time in step-by-step fashion toward, and in synchronism with the indexing movements of, a lamp sealing machine D into the mount holders of which the mounts are then successively loaded.

The chain conveyor A, which may be arranged to receive the lamp mounts 1 from the mount making machine, comprises a horizontally disposed endless chain 10 which extends between and runs around a drive sprocket 11 and an idler sprocket (not shown). The conveyor chain 10 is provided at uniformly spaced points therealong with mount holders 12 comprising spring loaded clips in which the lamp mounts 1 are carried in a vertical filament-down position, and it is intermittently indexed in timed relation to the index movements of the sealing machine D by suitable indexing means such as a ratchet wheel 13 and pawl 14 (Fig. 2) mounted on the drive sprocket shaft 15 and operated by a horizontal reciprocating rod 16 which is actuated, through bell crank lever 17, connecting rod 18, and cam follower arm 19, by a cam 20 on the cam shaft 21 of the sealing machine D. The conveyor chain 10 carries each mount 1 in succession to a transfer or unloading station located approximately half way around the run of the conveyor chain around the drive sprocket 11, at which station the mount 1 is then gripped between a pair of spring loaded jaws 22, 23 mounted on a rotatable head portion 24 of the mount turnover device B and is withdrawn or stripped from the spring clip mount holder 12 on the conveyor chain 10, and is inverted and placed on the rack conveyor C, by a 180° rotational movement of the head 24 about its horizontal axis of rotation which, like the rack conveyor C, extends transversely to the length of the chain conveyor A. The rotary head portion 24 is provided with two sets of mount holder jaws 22, 23 located on diametrically opposite sides of its axis of rotation, and it is rotatably mounted on a housing 25 which is fastened to one of the support brackets 26 of the rack conveyor C. The rotary head 24 is rotated through successive 180° clockwise rotational movements, as viewed from the mount receiving end of the rack conveyor C (Fig. 6), to effect the transfer and inverting of successive mounts 1 from the conveyor chain 10 onto the rack conveyor C. These successive 180° rotational movements of the rotary head 24 occur in timed relation to the index movements of the conveyor chain 10 and the sealing machine D, and they are produced by the downward stroke of a vertically reciprocable rack 28 meshed with a gear 29 which rotates the head 24 through a ratchet wheel and pawl mechanism (not shown). The return or upward stroke of the rack 28, which is ineffective to rotate the head 24 because of the inoperativeness of the ratchet and pawl drive on such return stroke, then operates the two sets of jaws 22, 23 on the head 24, through a suitable cam-actuated rack 30 and gear 31 arrangement for each set of jaws, so as to open the uppermost set of jaws 22, 23 to release the mount placed on the rack conveyor C, and simultaneously close the lowermost set of jaws 22, 23 so as to grip the mount 1 in that holder 12 on the conveyor chain 10 which is located at the unloading or transfer station thereof. The vertical reciprocating movement of the rack 28 to rotate the head 24 on the downward stroke of the rack, and operate the jaws 22, 23 on its upward stroke, is produced by a cam-actuated lever arm 32 connected by a link 33 to the rack 28 and operated by a cam 34 on the cam shaft 21 of the sealing machine D.

Figures 1, 3, 4, 5:
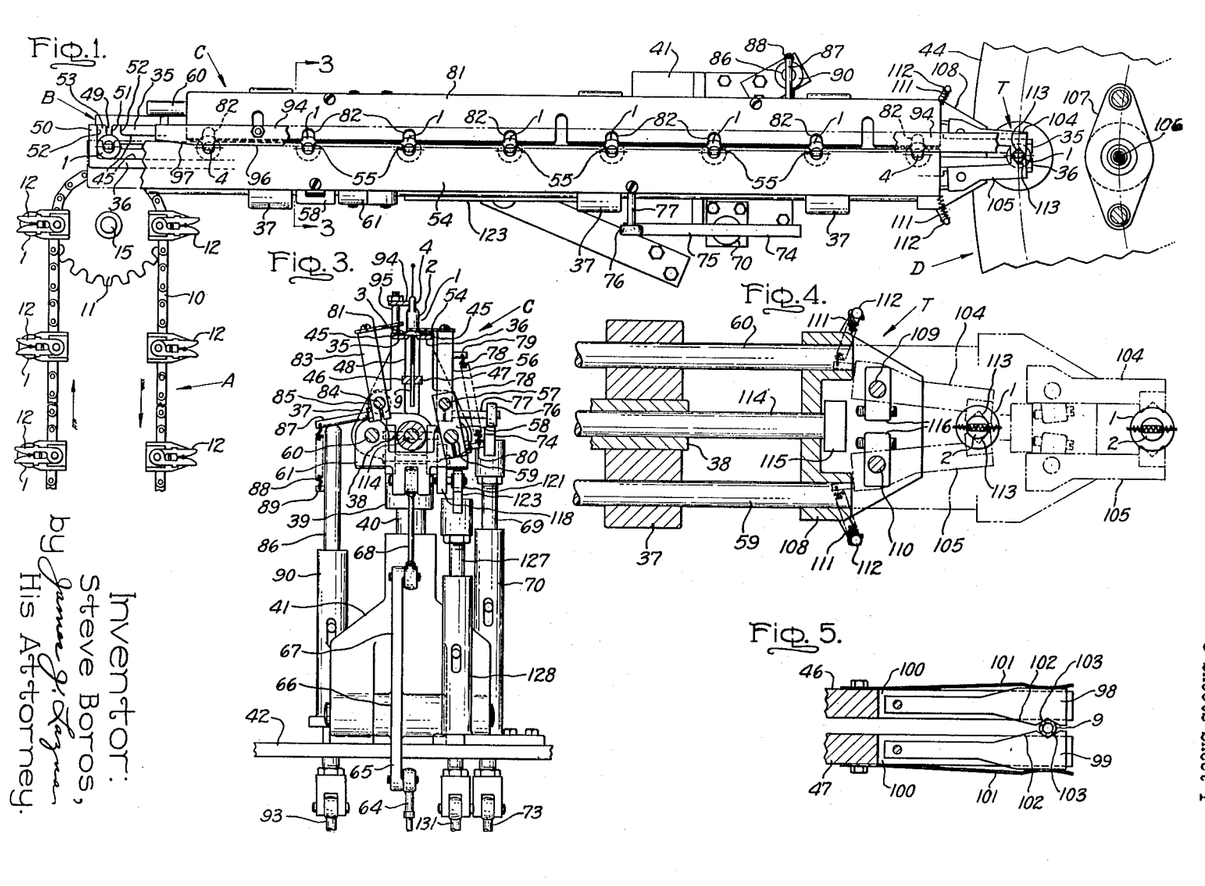
Fig. 1 is a plan view of an article conveyor mechanism according to the invention, together with associated apparatus for cooperation therewith.
Fig. 3 is a transverse cross section taken on the line 3—3 of Fig. 1.
Fig. 4 is a fragmentary horizontal cross section on the line 4—4 of Fig. 2, also showing in dash-dot lines the mount transfer jaws of the conveyor mechanism together with the mounts engaged thereby.
Fig. 5 is a fragmentary horizontal cross section on the line 5—5 of Fig. 2 showing the jaw means for holding the mounts in their furthest advanced position on the slide rails of the conveyor mechanism.
Figures 6, 7:
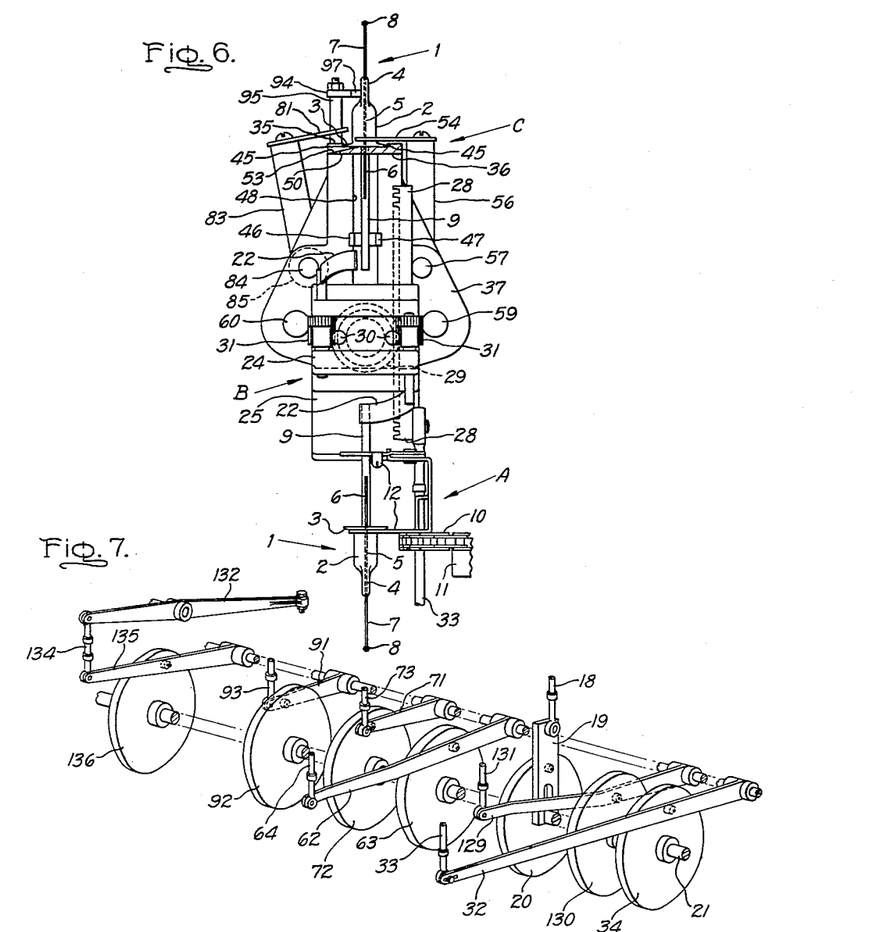
Fig. 6 is a front end elevation of the conveyor mechanism, partly in section through the front end of the mount-supporting track thereof and showing the associated mount turn-over mechanism for transferring the mounts from a mount supply conveyor chain and placing them in an inverted position on the mount-receiving end of the conveyor mechanism.
Fig. 7 is a perspective view of the cam shaft and cams for operating the conveyor mechanism.

The rack conveyor C comprising my invention is constituted of a horizontal mount-supporting slide track consisting of a pair of spaced parallel-extending stationary rails 35 and 36 on which the mounts 1 rest and along which they are slid or pushed in step-by-step fashion, in predetermined spaced relation to each other, toward the sealing machine D. The slide rails 35, 36 are fastened to and supported, at spaced points along their length, on a plurality of support blocks 37 which are fixedly mounted on a horizontally extending hollow support rod or tube 38. The horizontal support tube 38 is supported, in turn, in a mounting block 39 secured to the upper end of a vertical support column 40 upstanding from and fastened to a mounting bracket 41 which is secured to a bed plate 42 attached to the table or base (not shown) of the sealing machine D. The track rails 35, 36 and the conveyor support tube 38 extend parallel to each other in a direction normal to the length of the conveyor chain 10 and radially of the turret 44 of the sealing machine D, as shown in Fig. 1, and the track rails 35, 36 extend from a point directly over the mount 1 in that head 12 of the conveyor chain 10 located at the unloading station thereof to a point slightly overlying the periphery of the sealing machine turret 44. The slide rails 35, 36 may be made of any desired length, depending on the spacing desired between the chain conveyor A and the sealing machine D. In the particular case illustrated, the slide rails 35, 36 are of a length to support a row of ten mounts thereon at a uniform spacing therebetween of approximately three and one-half inches. As shown in Figs. 3 and 6, the mount-supporting slide rails 35, 36 are adapted to support the mount 1 in vertical upright position thereon with their flared ends 3 resting on the upper surface of the rails 35, 36 and their exhaust tubes 9 projecting downwardly through the space between the rails which, for such purpose, are spaced apart just enough to freely accommodate and permit sliding movement of the mount exhaust tubes 9 therebetween. The upper surfaces of the mount supporting slide rails 35, 36 are rabbeted or grooved along their facing longitudinal edges, as indicated at 45, to conjointly provide a recessed guideway or channel within which the flared end 3 of the mount 1 is received and guided to thereby keep the mounts in vertical centered position on the rails during their sliding movement therealong. During the sliding movement of the mounts 1 along the slide rails 35, 36, the mount exhaust tubes 9 are further confined between a pair of guide rails 46, 47 which serve to additionally guide the mounts and keep them from becoming tilted on the mount support rails 35, 36. The said guide rails 46, 47 are located beneath and extend parallel to the mount supporting slide rails 35, 36, and they are fastened to the conveyor support blocks 37 within vertically elongated upwardly opening slots or passageways 48 which are provided in the support blocks 37 to permit passage therethrough of the exhaust tubes 9 of the mounts 1 during their sliding movement along the slide rails 35, 36.

At their front or mount-receiving end, the mount supporting track rails 35, 36 are formed with a transverse entrance passageway or guideway 49 (Fig. 1) for the mounts 1 which leads into the longitudinal passageway between the slide rails 35, 36 and is formed by a transverse leg portion 50 provided on the front end portion of track rail 36 and extending across the front end 51 of the other track rail 35 in spaced relation thereto. The spacing of the transverse leg 50 of the track rail 36 from the front end 51 of the other track rail 35 corresponds substantially to the spacing between the two rails 35, 36 along their length so as to permit the passage of the exhaust tubes 9 of the mounts through the passageway 49 during the transfer of the mounts onto the rails 35, 36 by the mount turnover device B. The upper surfaces of the transfer leg 50 and the front end portion of track rail 35 are rabbeted or grooved transversely of the rails 35, 36, in the same manner as the longitudinal rabbeting 45 of the track rails, to afford a transverse guideway 52 for receiving and guiding the flared ends 3 of the mounts 1 during their transfer movement onto the track rails 35, 36 by the turnover mechanism B. The transverse exhaust tube passageway 49 and the transverse rabbeted guideway 52 are vertically aligned with the vertical plane of rotational transfer and inverting movement of the mounts 1 by the turnover mechanism B so as to permit the passage of the mounts 1 therethrough, during the very last portion of their rotary transfer movement, into proper position on the track rails 35, 36, in alignment with the longitudinal mount passageway therebetween, for subsequent advance movement along the track rails. The upper surfaces of the transversely rabbeted portions of the track rails 35, 36 forming the transverse guideway 52 for the flared end 3 of the mounts 1 are slightly inclined, as shown at 53 in Fig. 6, to provide clearance for the flared end 3 of the mounts 1 so as not to interfere therewith during their rotary transfer movement onto the conveyor track rails 35, 36 by the mount turnover mechanism B.

Following the transfer and placement of a mount 1 onto the slide rails 35, 36 of the rack-type conveyor and loading mechanism C, the said mount 1, along with the rest of the mounts which have been previously placed on the slide rails 35, 36 and have not as yet been transferred off the rear end of the conveyor C into the sealing machine D, are then advanced along the slide rails in step-by-step fashion by an intermittently reciprocating elongated shuttle plate 54 which, in addition to being mounted for horizontal reciprocating movement lengthwise of the slide tracks 35, 36, is also pivotably mounted for intermittent oscillating or rocking movement transversely of the slide rails toward and away from the mounts 1 thereon. The elongated shuttle plate 54 extends parallel to and is substantially coextensive with the mount-supporting slide rails 35, 36, and it is disposed horizontally in a position overlying slide rail 36 at an elevation to engage the glass stem tube portion 2 of the mounts 1, adjacent the flanged end 3 thereof, when the shuttle plate is pivoted inwardly of the conveyor C to its operative mount-advancing position. As shown in Fig. 1, the shuttle plate 54 is provided with a plurality of notches or slots 55 in its inner longitudinal edge uniformly spaced therealong and of a width just large enough to accommodate the glass stem tubes 2 of the mounts 1 so that the stem tubes will be straddled by the shuttle plate when the latter is pivoted inwardly of the conveyor track rails 35, 36 to its operative mount-advancing position. The number and spacing of the notches 55 corresponds to the desired number and spacing of the mounts 1 on the slide rails 35, 36. The mount-advancing shuttle plate 54 is fastened to the upper ends of and supported by a pair of vertically extending support arms 56, at widely spaced points along the length of the shuttle plate, and the said support arms 56 are, in turn, fastened at their lower ends on a horizontally disposed pivot shaft 57 which extends parallel to the mount slide rails 35, 36 and is journalled and also longitudinally slidable in the support blocks 37.

In the operation of the shuttle plate 54 to advance the line of mounts 1 on the conveyor track slide rails 35, 36, a substantially rectangular path of movement is imparted to the shuttle plate, by the proper sequence of reciprocating and pivotable movements thereof, such that the advance stroke of the shuttle plate toward the sealing machine D occurs while the shuttle plate is in its inward pivoted position in engagement with the line of mounts 1 on the track rails 35, 36, thus advancing the mounts therealong, and the ensuing return stroke of the shuttle plate occurs while it is in its outward pivoted position disengaged from the line of mounts 1 on the conveyor track rails so as to leave the mounts in their advanced position thereon. The longitudinal advance and retraction movement of the shuttle plate 54 is imparted thereto by a yoke member 58 slidably mounted on the pivot shaft 57 and straddling one of the support arms 56 for the shuttle plate 54, and fastened to one of a pair of horizontally disposed parallel reciprocating slide rods 59, 60 (i.e., to slide rod 59) which extend parallel to the pivot shaft 57 and to the conveyor track rails 35, 36 and are slidably mounted in the support blocks 37 for longitudinal reciprocation therein. The slide rods 59, 60 are tied together by a tie block 61 so as to reciprocate in unison, and they are reciprocated by a cam follower lever arm 62 which is actuated by a cam 63 on the cam shaft 21 and is connected by the vertical connecting rod 64 to one arm 65 of a bell crank lever 66 pivoted on the bracket 41, the other arm 67 of which lever is connected by link 68 to the tie block 61.

The pivotable oscillating movement of the shuttle plate 54 is produced by a vertical operating rod 69 which is mounted for vertical reciprocation in a sleeve bearing 70 fastened to and upstanding from the bed plate 42 and is reciprocated by a cam follower lever arm 71 which is actuated by a cam 72 on cam shaft 21 and is connected by link 73 to the lower end of the operating rod 69. At its upper end, the operating rod 69 is provided with a horizontal roller track member or plate 74 which extends parallel to the slide rods 59, 60 and to the direction of reciprocating movement of the shuttle plate 54, and the horizontal upper track surface 75 of which engages with a roller 76 carried on a pin 77 fastened to the lower end of one of the shuttle plate support arms 56 and projecting horizontally therefrom in a direction laterally of the pivot shaft 57. The roller track surface 75 is of sufficient length and wide enough to engage the roller 76 at all times throughout the full extent of its travel during the advance and retraction movements of the shuttle plate 54 as well as during the pivotal movement of the latter, and it is continuously maintained in engagement with the roller 76 by the force of a tension coil spring 78 connected at its opposite ends to posts 79 and 80 extending, respectively, from one of the shuttle plate support arms 56 and from the yoke member 58. The upward stroke of the operating rod 69 acts to pivot or rock the support arms 56 and the shuttle plate 54 inwardly of the conveyor C into engagement with the mounts 1 thereon, against the tension of the coil springs 78. On the downward stroke of the operating rod 69, the coil spring 78 acts to pivot or rock the support arms 56 and the shuttle plate 54 outwardly of the conveyor C so as to disengage the shuttle plate from the mounts 1 on the conveyor.

The operation of the shuttle plate 54 is timed with the operation of the mount turnover mechanism B so as to pivot inwardly of the conveyor track rails 35, 36, and engage the mounts 1 thereon, as soon as the foremost one of the said mounts has been placed on the track rails by the mount turnover mechanism and while it is still gripped by the jaws 22, 23 thereof. The jaws 22, 23 of the turnover mechanism B then open and disengage from the exhaust tube 9 of the foremost mount 1 on the slide rails 35, 36 so as to free the said mount for advance movement along the rails, following which the rotary head 24 of the turnover mechanism B is then rotated through a small angle of its next 180° rotary mount transfer movement, for example 20° or so, sufficient to clear the jaws 22, 23 of the turnover mechanism out of the path of advance movement of the said foremost mount along the slide rails. Thereupon, the inwardly pivoted shuttle plate 54 is moved through its advance stroke to push or slide the line of mounts 1 engaged thereby, including the said foremost mount, along the slide rails 35, 36 to their next advanced position thereon. Upon completion of its advance stroke, the shuttle plate 54 is then pivoted or swung outwardly to its inoperative position disengaged from the mounts 1 on the slide rails 35, 36, after which the shuttle plate is then moved through its return stroke back to its initial position in readiness for the start of another cycle of operation.

During the time the mount advancing shuttle plate 54 is in its outward or inoperative position disengaged from the line of mounts 1 on the conveyor track rails 35, 36, the said mounts are held or locked in their advanced position thereon by a mount position holding or locking plate 81 so as to assure their being properly aligned with and thus re-entering the notches 55 in the shuttle plate 54 on the next inward rocking movement of the shuttle plate. To this end, the mount position locking plate 81 is pivotally mounted, in a manner similar to the shuttle plate 54, for intermittent oscillating or rocking movement transversely of the conveyor slide rails 35, 36 toward and away from the mounts 1 thereon. The mount position locking plate 81 is similar in construction to the mount advancing shuttle plate 54 and it extends parallel to the mount supporting slide rails 35, 36 in a horizontal position along the side thereof opposite to that side occupied by the shuttle plate 54 so as to be in opposed relation thereto, and in a position overlying slide rail 35 at an elevation such as to engage the glass stem tube portion 3 of the mounts 1, adjacent the flanged end 3 thereof, when the locking plate 81 is pivoted or rocked inwardly of the conveyor to its operative mount-engaging or locking position. Unlike the shuttle plate 54, the mount locking plate 81 is not longitudinally reciprocable but instead is fixed longitudinally of the conveyor track rails 35, 36, and it is provided with a plurality of mount-receiving notches or slots 82 in its inner longitudinal edge which correspond in number and spacing to, and are aligned with the notches 55 in the shuttle plate, in a direction transversely of the conveyor slide rail 35, 36, when the shuttle plate is in either of its fully advanced or fully retracted positions. The mount locking plate 81 is shorter in length than the shuttle plate 54 by an amount approximately equal to the corresponding center-to-center spacing between the respective notches 55 and 82 in the plates 54 and 81, so that the locking plate 81 spans and engages one less mount 1 on the conveyor track rails 35, 36 than is spanned and engaged by the shuttle plate 54. The positioning of the locking plate 81 longitudinally of the mount slide rails 35, 36 is such as to engage all except the foremost and rearmost ones of the line of mounts 1 on the slide rails when the locking plate is pivoted to its inward or mount locking position. The locking plate 81 thus does not obstruct the path of transfer movement of the mounts 1 onto the conveyor track rails 35, 36 by the mount turnover mechanism B, nor does it obstruct or interfere with the transfer means T for removing the mounts off the rear end of the conveyor track rails and transferring them into the sealing machine D.

Like the shuttle plate 54, the mount position locking plate 81 is fastened to and supported on the top ends of a pair of vertical support arms 83 which are fastened at their lower ends to a horizontally extending pivot shaft 84 similar to the pivot shaft 57 for the support arms 56 for the shuttle plate 54. The pivot shaft 84 extends horizontally in a direction parallel to the mount slide rails 35, 36 of the conveyor and it is journalled in the conveyor support blocks 37. A pair of stop collars 85 (Fig. 3) fastened on the pivot shaft 84 and abutting against the facing sides of two of the conveyor support blocks 37, holds the pivot shaft 84 and therefore the mount positioning locking plate 81 against movement longitudinally of the conveyor track rails 35, 36, and also fixes the position of the locking plate 81 longitudinally of the conveyor track rails so that the mount-receiving notches 82 of the locking plate will be aligned with and opposite the corresponding mount-receiving notches 55 in the shuttle plate 54 when the latter is in either of its fully advanced or fully retracted positions.

The mount position holding or locking plate 81 is intermittently pivoted or rocked, in timed relation to the intermittent pivotal movement of the mount-advancing shuttle plate 54, so as to swing inwardly of the conveyor C substantially simultaneously with, and in effect follow, the outward pivotal movement of the shuttle plate 54 following each advance stroke of the latter. The line of mounts 1 on the conveyor track rails 35, 36 are thereby caught or trapped in the notches 82 in the inwardly pivoting locking plate 81 as soon as the mounts 1 are disengaged by the outwardly pivoting shuttle plate 54. The locking plate 81 thus holds or locks the mounts 1 in the positions to which they have been advanced on the conveyor slide rails 35, 36 by the shuttle plate 54. In the same manner, the succeeding outward pivotal movement of the locking plate 81 to disengage it from the line of mounts 1 on the conveyor track rails 35, 36 occurs substantially simultaneously with the succeeding inward pivotal movement of the shuttle plate 54 to re-engage the line of mounts on the conveyor track rails in readiness for the next advance movement of the mounts therealong. By virtue of this conjoint rocking movement of the shuttle and locking plates 54 and 81, the mounts 1 on the conveyor slide rails 35, 36 are therefore held at all times within the mount-receiving notches of one or the other of the said plates 54, 81 from the time the mounts are first placed and released onto the slide rails by the jaws 22, 23 of the mount turnover mechanism B until they reach their final or unloading position on the slide rails.

The pivotal oscillating or rocking movement of the mount positioning locking plate 81 is effected by a vertical push or operating rod 86 the upper end of which engages with a lever arm or pin 87 fastened to the lower end of one of the locking plate support arms 83 and projecting horizontally therefrom in a direction laterally of the pivot shaft 84. The lever arm 87 is continuously held in engagement with the upper end of the push rod 86 by the force of a tension coil spring 88 connected at its opposite ends to the outer end of the lever arm 87 and to a post 89 on the push rod 86. The vertical push or operating rod 86 is mounted for vertical reciprocation in a sleeve bearing 90 fastened to and upstanding from the bed plate 42 and is reciprocated by a cam follower lever arm 91 which is actuated by cam 92 on cam shaft 21 and is connected by link 93 to the lower end of the operating rod 86.

During the course of their advance movement along the slide rails 35, 36, the mounts 1 are preferably oriented into and maintained in a predetermined rotative position about their respective axes, with their flattened stem press portions 4 disposed lengthwise of the mount slide rails. For such purpose, the conveyor mechanism C is provided with a stationary mount orienting guide plate 94 which extends lengthwise of the mount slide rails 35, 36 along that side thereof occupied by the rail 35 and is located above the said rail 35 at an elevation such that the flattened stem press portions 4 of the mounts engage the guide plate 94 during the course of their travel along the slide rails. The stationary guide plate 94 is fastened to the upper ends of a plurality of support posts 95 fastened to and upstanding from the slide rail 35. The inner longitudinal side or mount-engaging edge 96 of the stationary guide plate 94 extends parallel to the path of travel of the mounts 1 along the slide rails 35, 36 and it is tapered or flared outwardly at its front end, as indicated at 97 in Fig. 1, to provide a camming surface against which the flattened stem press 4 of each mount 1 engages and rides, during the course of its first index movement along the slide rails 35, 36, to thereby rotate the advancing mount into proper oriented position on the slide rails with its flattened stem press 4 disposed lengthwise of the slide rails. After being thus oriented, the mounts 1 are then held in their said oriented position, throughout the remainder of their travel along the slide rails 35, 36, by the longitudinally extending inner edge 96 of the guide plate 94 against which the flattened stem presses 4 of the mounts ride during their travel along the slide rails.

During the advance movement of each mount 1 by the shuttle plate 54 to its final or unloading position on the slide rails 35, 36 at the rearmost end thereof overlying the turret 44 of sealing machine D, the exhaust tube 9 of the mount passes between a pair of spring loaded pivoted jaws 98 and 99 (Fig. 5) which act to hold the mount in its said final advanced position on the slide rails following the disengagement of the said mount by the shuttle plate 54 on the subsequent outward pivotal movement of the latter. As shown in Fig. 5, the jaws 98, 99 are pivoted at one end on the exhaust tube guide rails 46, 47, within horizontal slots 100 extending longitudinally thereof, so as to swing in a horizontal plane, and they are continuously urged toward one another by the force of leaf springs 101 which are fastened at one end to the respective exhaust tube guide rails 46, 47 and bear at their other or free ends against the outward sides of the pivoted jaws 98, 99. The opposed jaws 98, 99 extend horizontally and lengthwise of the mount slide rails 35, 36 from their pivot points in the direction of advance movement of the mounts 1 therealong, and their facing inner edges are tapered as indicated at 102 to provide camming surfaces against which the exhaust tubes 9 of the mounts engage and ride, during their advance movement to their final advanced or unloading position on the slide rails, to thereby spread or force the jaws 98, 99 apart, against the force of the springs 101, to permit the passage of the exhaust tube therebetween. The facing inner edges of the jaws 98, 99 are also formed with opposed V-notches 103 which serve as jaw faces to snap around and positively hold or lock the exhaust tubes of the mounts in place upon advance of the mounts to their final unloading position on the mount slide rails 35, 36.

Figure 2:
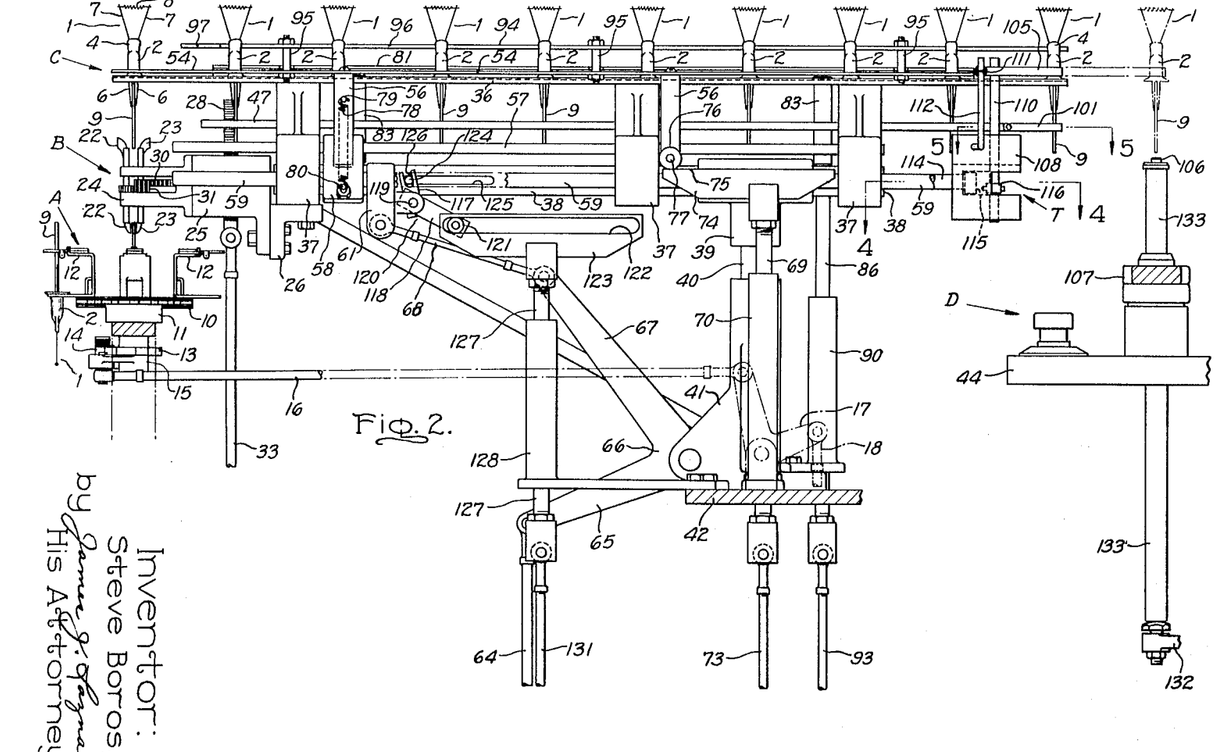
Fig. 2 is a side elevation of the article conveyor mechanism shown in Fig. 1.

Upon reaching their furthest advanced or unloading position on the slide rails 35, 36 of the conveyor mechanism C, the mounts 1 are then withdrawn off the rear end of the slide rails and transferred, by mount transfer means T comprising a pair of transfer jaws 104, 105, to a mount loading position located directly over and in vertical alignment with the vertically reciprocable hollow mount pin 106 of that head 107 of the sealing machine D which is then located at the mount loading station thereof. The turret 44 of the sealing machine D is indexed in timed relation to the operations of the transfer means T by conventional indexing means (not shown) of the barrel cam type mounted on the main drive shaft of the sealing machine, the said shaft also driving in timed relation therewith the cam shaft 21 of the sealing machine. The mount transfer jaws 104, 105 are reciprocated longitudinally of the mount slide rails 35, 36 simultaneously with, and through the same advance and retraction strokes as the mount advancing shuttle plate 54 to thereby effect the transfer of the successive mounts 1 on the slide rails to the successive heads 107 of the sealing machine, and the reciprocating transfer movement of the transfer jaws 104, 105 is produced by the same actuating means which produces the longitudinal reciprocating movement of the mount advancing shuttle plate 54. To this end, the transfer jaws 104, 105 are pivotally mounted on a transfer jaw head or support block 108 which is fastened to the rearmost ends of the two slide rods 59, 60 so that the transfer support block 108 and the transfer jaws 104, 105 reciprocate in unison with the slide rods 59, 60 which also effect the reciprocation of the mount advancing shuttle plate 54. As shown in Figs. 2 and 4, the transfer jaws 104, 105 are fastened at one end to vertical pivot shafts 109 and 110, respectively, upstanding from and journalled in the support block 108, so as to swing in a horizontal plane, and they extend horizontally from their pivot points lengthwise of the mount slide rails 35, 36 in the direction of advance movement of the mounts 1 therealong. The transfer jaws 104, 105 are located above the slide rails 35, 36 at an elevation to engage the glass stem tube 2 of the mounts 1 thereon, and they are continuously urged toward one another by the force of tension coil springs 111 which are connected at one end to the pivoted ends of the respective jaws 104, 105 and at their other ends to respective spring posts 112 fastened to and upstanding from the transfer jaw support block 108. As shown more particularly in Fig. 4, the transfer jaws 104, 105 are provided at their free ends with opposed V-notches 113 forming jaw faces within which the stem tubes 2 of the mounts 1 are gripped and held in definite position relative to the jaws with sufficient gripping power to strip the exhaust tube 9 of the mount from between the spring-loaded V-jaws 98, 99 during the transfer stroke of the transfer means T.

In the operation of the mount transfer means T, the transfer jaws 104, 105 are spring held in their closed position gripping the mount therebetween on their advance or mount transferring stroke, and in their open position disengaged from the mount on their return stroke. After reaching their advanced position, the transfer jaws 104, 105 are then opened to release the mount 1 into the sealing machine head 107 and are maintained in their opened position until after they reach their retracted position when they are again closed to grip the next mount 1 to be transferred to the sealing machine. The pivotal opening and closure movement of the transfer jaws 104, 105 is controlled by an operating rod 114 which extends through and is reciprocable within the hollow support tube 38 of the conveyor mechanism C. One end of the operating rod 114 extends into the support block 108 of the transfer means T and is provided with a striker block 115 (Fig. 4) which, on inward movement of the operating rod into the support block 108, abuts against the ends of lever arms 116 fastened on the pivot shafts 109, 110 of the jaws 104, 105 to thereby pivot the said jaws outwardly to their open position, against the force of the springs 111. To provide the above-mentioned operation of the transfer jaws 104, 105 so that they remain closed throughout their advance or mount transfer stroke and opened throughout their return stroke, the jaw operating rod 114 is arranged to move in unison with the support head 108 of the transfer means T, during the advance and retraction strokes thereof, so as to maintain the relative position of the jaw pivoting striker block 115 with respect to the lever arms 116 of the transfer jaws during such advance and retraction movement. The pivotal movement of the transfer jaws 104, 105 to open them when they reach their advanced position and close them when they reach their retracted position is then effected by a slight additional advance or retraction movement, respectively, of the operating rod 114 relative to the support block 108 and lever arms 116 of the transfer jaws.

The reciprocating movement of the operating rod 114 in the above described manner is produced by a pair of lever arms 117, 118 (Fig. 2) which are fastened to a horizontal pivot shaft 119 so as to form therewith, in effect, a bell crank lever 120. The pivot shaft 119 is disposed transversely of the slide rods 59, 60 and is journalled in the tie block 61 which joins the said slide rods together. The pivot shaft 119 and bell crank lever 120 therefore move bodily in unison with the tie block 61 and with the slide rods 59, 60 during the reciprocation of the latter by the bell crank lever 66 and connecting link 68. During such reciprocating movement of the tie block 61 and slide rods 59, 60, the bell crank lever 120 is held or locked in a fixed rotative position by means of a roller 121 mounted on the free end of the lever arm 118 and engaging and riding in a horizontal slot or roller cam track 122 provided in a cam plate 123 which is mounted for vertical reciprocation but which is held in a fixed elevational position during the time the tie block 61 and slide rods 59, 60 are being reciprocated. The bodily translation movement which is thus imparted to bell crank lever 120 by the tie block 61 is transmitted to the operating rod 114 for the transfer jaws 104, 105 by the lever arm 117 which is connected to the operating rod 114 through a pin and slot connection comprising a pin 124 fastened on the operating rod and extending through a longitudinal slot 125 in the conveyor support tube 38 into a slot 126 provided in the lever arm 117. At the end of the advance stroke of the transfer means T, the vertically reciprocable cam plate 123 is moved downwardly to its lower position to pivot the bell crank lever 120 and advance the transfer jaw operating rod 114 a sufficient further distance ahead to cause the striker block 115 thereon to abut against the lever arms 116 of the transfer jaws 104, 105 and pivot the latter to their open position, thus releasing the mount 1 held therein. The cam plate 123 then remains in its said lowered position, thereby maintaining the transfer jaws 104, 105 open, throughout the entire return stroke of the transfer means T until it reaches its retracted position at which time the cam plate 123 is then raised to its original elevated position to thereby pivot the bell crank lever 120 and retract the transfer jaw operating rod 114 a sufficient further distance backwardly to cause the striker block 115 thereon to disengage from the lever arms 116 of the transfer jaws 104, 105 and thus permit the springs 111 to close the said transfer jaws so as to grip the next mount 1 to be transferred off the slide rails 35, 36. The cam plate 123 is fastened on the upper end of a vertical actuating rod 127 which is slidably mounted for vertical reciprocation in a sleeve bearing 128 fixedly supported on the bed plate 42 of the conveyor mechanism C, and it is vertically reciprocated in proper timed relation to the advance and retraction strokes of the transfer means T, to effect the opening and closing of the transfer jaws 104, 105, by a cam follower lever arm 129 which is actuated by a cam 130 on the cam shaft 21 and is connected to the vertical actuating rod 127 by a link 131.

During the interval while the mount 1 which has been transferred off the slide rails 35, 36 is held by the mount transfer means T in its loading position directly over that head 107 of the sealing machine D at the mount loading station thereof, the hollow mount pin 106, which is in a lowered position during the transfer of the mount to its loading position over the head 107, is then raised to cause the exhaust tube 9 of the mount to enter the bore of the hollow mount pin 106 and the mount to become supported in place on the mount pin, thereby completing the loading of the mount 1 into the head 107. The vertical reciprocation of the mount pin 106 is produced by a horizontal lever arm 132 which abuts at one end against the lower end of the vertically extending supporting spindle 133 for the mount pin and is connected by link 134 to a cam follower lever arm 135 actuated by a cam 136 on cam shaft 21.

In the operation of the mount conveyor and loading mechanism comprising my invention, the mounts 1 in the holders 12 of the chain conveyor A are successively gripped by the jaws 22, 23 of the rotary mount inverting mechanism B which then transfers the mounts to, and places them in an inverted or filament end-up position on the front end of the mount slide rails 35, 36 of the mount conveyor mechanism C. While still held in place on the slide rails 35, 36 by the jaws 22, 23 of the mount inverting mechanism B, the mount position locking plate 81 of the conveyor mechanism C pivots outwardly to disengage itself from the line of mounts 1 on the slide rails 35, 36 while the mount advancing shuttle plate 54 at the same time pivots inwardly of the conveyor mechanism to engage, within its notches 55, all the mounts 1 on the slide rails except the last one located at the far end of the slide rails, the said last mount 1 being gripped at such time by the transfer jaws 104, 105 of the transfer means T. The shuttle plate 54 and the transfer means T then advance simultaneously to carry the line of mounts engaged by the shuttle plate one position forwardly along the conveyor slide rails 35, 36, and to carry the last mount engaged by the transfer jaws 104, 105 to its mount loading position directly over the head 107 of the sealing machine D at the mount loading station thereof. While the last mount 1 is thus held in loading position by the transfer jaws 104, 105, the mount pin 106 of the sealing machine head 107 is raised to its elevated position to cause the exhaust tube 9 of the mount to enter the bore of the mount pin and the mount to become supported in place on the mount pin, following which the transfer jaws 104, 105 are then opened to release the mount thus supported in the head 107. Concurrently with the above described mount pin elevating and mount releasing operations, the shuttle plate 54 is pivoted outwardly of the conveyor mechanism C to its inoperative position disengaged from the mounts 1 on the slide rails 35, 36, and the mount position locking plate 81 is pivoted inwardly of the conveyor mechanism to engage the mounts 1 within the mount-receiving notches 82 of the locking plate so as to positively hold the mounts in place on the slide rails in their advanced position thereon. The shuttle plate 54 and the transfer means T are then simultaneously retracted to their original starting position in readiness for the start of another cycle of operation of the apparatus.

What I claim as new and desire to secure by Letters Patent of the United States is:

1. An article conveyor mechanism comprising a pair of approximately horizontally disposed stationary slide track rails extending parallel to each other in spaced relation and adapted to support and guide a row of articles thereon for sliding movement therealong, an elongated article-advancing shuttle member and an elongated article position locking member extending horizontally in spaced parallel relation along opposite sides of said track and mounted for intermittent oscillating movement laterally of said track for alternative engagement and disengagement with the articles thereon, said members each having a plurality of article-engaging means correspondingly spaced apart uniformly along said members and adapted to engage the articles on said track on lateral movement of said members inwardly of said track and to disengage from said articles on outward lateral movement of said members, said shuttle member being further mounted for reciprocating movement longitudinally of said track, actuating means for intermittently reciprocating and oscillating said shuttle member in proper sequence to impart thereto an approximately rectangular path of movement effective to successively advance the said articles step-by-step along the said track during the successive advance strokes of said shuttle member while engaged with the said articles, said locking member being fixed longitudinally of said track in a position in which its said article-engaging means are located opposite and in alignment with respective ones of the article-engaging means on said shuttle member when the latter is in either of its fully advanced or fully retracted positions longitudinally of said track, and operating means intermittently oscillating said locking member in timed relation to the oscillation of said shuttle member by said actuating means to cause said members to alternately shift between their inward article-engaging and outward article-disengaged positions so that said locking member engages with and holds said articles fixed in their successive advanced positions on said track during the period the said shuttle member is disengaged from the said articles on said track.

2. An article conveyor mechanism comprising a pair of approximately horizontally disposed stationary slide track rails extending parallel to each other in spaced relation and adapted to support and guide a row of articles thereon for sliding movement therealong, an elongated article-advancing shuttle plate member and an elongated article-position locking plate member disposed horizontally in spaced parallel relation along opposite sides of said track and pivotally mounted for intermittent oscillating movement laterally of said track for alternative engagement and disengagement with the articles thereon, said plate members having a plurality of cooperating article-receiving notches in their facing longitudinal side edges correspondingly spaced apart uniformly therealong and adapted to receive and confine therein the articles on said track upon pivotal movement of said plate members inwardly of said track to their article-engaging position, said shuttle plate member being further mounted for reciprocating movement longitudinally of said track, actuating means for intermittently reciprocating and pivotally oscillating said shuttle plate member in proper sequence to impart thereto an approximately rectangular path of movement effective to successively advance the said articles step-by-step along the said track during the successive advance strokes of said shuttle plate member while in its inward pivoted article-engaging position, said locking plate being fixed longitudinally of said track in a position in which its said article-receiving notches are located opposite and in alignment with respective ones of the article-receiving notches in said shuttle plate member when the latter is in either of its fully advanced or fully retracted positions longitudinally of said track, and operating means intermittently pivoting said locking plate member in timed relation to the pivotal movement of said shuttle plate member by said actuating means to cause said members to alternately shift approximately simultaneously between their inward article-engaging and their outward article-disengaged positions so that said locking plate member engages with and holds the said articles fixed in their successive advanced positions on said track during the period the said shuttle plate member is disengaged from the said articles.

3. A lamp mount conveyor for advancing in step-by-step manner a row of stem type lamp mounts each comprising a glass stem tube having a flared end and an exhaust tube projecting endwise from the said end, said conveyor comprising a pair of approximately horizontally disposed stationary slide track rails extending parallel to each other in spaced relation and adapted to support and guide the said mounts in upright position thereon for sliding movement therealong with the flared ends of their stem tubes resting on the upper sides of said track rails and their projecting exhaust tubes extending downwardly between and confined by the said track rails, the upper sides of said track rails being rabbeted along their facing longitudinal edges to conjointly provide a guideway within which the flared stem tube ends of the lamp mounts are confined to guide the mounts and assist in maintaining them in true upright position on the track rails during their sliding movement therealong, a mount-advancing shuttle plate member and a mount position locking plate member disposed horizontally in spaced parallel relation along opposite sides of and above said track in parallel relation thereto and pivotally mounted for intermittent bodily swinging movement laterally of said track about parallel horizontal axes extending longitudinally thereof for alternative engagement and disengagement with the stem tubes of the mounts thereon, said plate members having a plurality of cooperating uniformly spaced mount-receiving notches in their facing longitudinal edges adapted to receive and confine therein the stem tubes of the mounts on said track upon pivotal movement of said plate members inwardly of said track to their respective mount-engaging position, said shuttle plate member being further mounted for reciprocating movement longitudinally of said track to advance the mounts step-by-step therealong and said locking plate member being fixed longitudinally of said track in a position in which its said mount-receiving notches are located opposite and in alignment with respective ones of the mount-receiving notches in said shuttle plate member when the latter is in either of its fully advanced and fully retracted positions longitudinally of said track, and operating means for pivoting said plate members in proper time relation to swing them alternately inward of said track into engagement with the mounts thereon and alternately outward to disengage from the said mounts and to also reciprocate said shuttle plate member through its advance stroke while in its inward pivoted mount-engaging position and through its return stroke while in its outward pivoted mount-disengaged position, said locking plate member being pivoted inwardly to its mount-engaging position by said operating means substantially simultaneously with the outward pivoting of said shuttle plate member to its mount-disengaged position by said operating means so that the locking plate member engages with and holds the said mounts fixed in their successive advanced positions on said track during the period the said shuttle plate member is disengaged from the said mounts.

4. An article conveyor mechanism comprising a fixedly mounted horizontally disposed elongated support member, a plurality of support brackets fastened on said support member at spaced points therealong, a pair of horizontally disposed stationary slide track rails fixedly mounted on said support brackets and extending parallel to each other in spaced relation for supporting and guiding a row of articles thereon for sliding movement therealong, article-advancing means comprising a horizontally disposed shuttle plate member extending along one side of said slide track, means mounting said shuttle plate member on said support brackets for linear reciprocation movement longitudinally of said track to advance the said articles therealong and for pivotal movement laterally of said track about parallel horizontal axes extending longitudinally thereof to swing into and out of engagement with the said articles thereon, said shuttle plate member having a plurality of uniformly spaced article-receiving notches in its inward longitudinal side edge adapted to receive and confine therein the articles on said track upon pivotal movement of said shuttle plate member inwardly of the track to its article-engaging position, and operating means for intermittently reciprocating and pivoting said shuttle member in proper sequence to move said shuttle member through its advance stroke while in its inward pivoted position in engagement with the articles on said track and through its return stroke while in its outward pivoted position disengaged from the said articles.

5. An article conveyor mechanism comprising a fixedly mounted horizontally disposed elongated support member, a plurality of support brackets fastened on said support member at spaced points therealong, a pair of horizontally disposed stationary slide track rails fixedly mounted on said support bracket and extending parallel to each other in spaced relation for supporting and guiding a row of articles thereon for sliding movement therealong, an elongated article-advancing shuttle plate member and an elongated article position locking plate member disposed horizontally in spaced parallel relation along opposite sides of said track, horizontally disposed pivot shaft means extending parallel to said track rails and journalled in said support brackets and respectively fastened to and mounting said plate members for independent pivotal swinging movement laterally of said track for alternative engagement and disengagement with the articles thereon, said plate members having a plurality of cooperating article-receiving notches in their facing longitudinal side edges uniformly spaced therealong and adapted to receive and confine therein the articles on said track upon pivotal movement of said plate members inwardly of said track to their respective article-engaging position, the pivot shaft means for said shuttle plate member being slidably mounted in said support brackets for reciprocation of the said pivot shaft means and associated shuttle plate member longitudinally of said track to advance the articles therealong, and the pivot shaft means for said locking plate member being fixed longitudinally of said track in a position in which the article-receiving notches of the locking plate are located opposite and in alignment with respective ones of the article-receiving notches in said shuttle plate member when the latter is in either of its fully advanced and fully retracted positions longitudinally of said track, and operating means for rotating said pivot shafts and pivoting said plate members in proper time relation to swing them alternately inward of said track into engagement with the articles thereon and alternately outward to disengage from the said articles and to also reciprocate said shuttle member through its advance stroke while in its inward pivoted article-engaging position and through its return stroke while in its outward pivoted article-disengaged position.

6. An article conveyor and feeding mechanism comprising a pair of approximately horizontally disposed stationary slide track rails extending parallel to each other in spaced relation and adapted to support and guide a row of articles thereon for sliding movement therealong, article advancing means mounted for reciprocation longitudinally of said track and engageable with the articles thereon on its advance stroke to slide the said articles ahead one position at a time, a pair of transfer jaws reciprocable longitudinally of said track in unison with said article-advancing means for transferring the last article on said track off the end thereof and carrying it to a position for loading into an associated article holder, operating means for reciprocating the said article-advancing means and transfer jaws in unison, and jaw-actuating means operating in proper time relation to the reciprocating movement of said transfer jaws to close the said jaws when in their retracted position so as to grip the last article on said track and to open the said jaws when in their advanced position so as to release the said last article.

7. An article conveyor and loading mechanism comprising a fixedly mounted horizontal support tube, a plurality of support brackets fastened on said tube at spaced points therealong, a pair of horizontally disposed stationary slide track rails fixedly mounted on said support brackets and extending parallel to each other in spaced relation for supporting and guiding a row of articles thereon for sliding movement therealong, article-advancing means reciprocably mounted on said support brackets for reciprocation longitudinally of said track and engageable with the mounts thereon on its advance stroke to slide the said mounts ahead one position at a time, a pair of transfer jaws reciprocably mounted on said support brackets for reciprocation longitudinally of said track in unison with said article-advancing means for transferring the last article on said track off the end thereof and carrying it to a position for loading into an associated article holder, operating means for reciprocating the said article-advancing means and transfer jaws in unison, and jaw actuating means comprising an actuating rod reciprocable within said support tube and operating in proper time relation to the reciprocating movement of said transfer jaws to close the said jaws when in their retracted position so as to grip the last article on said track and to open the said jaws when in their advanced position so as to release the said last article.

8. A lamp mount conveyor mechanism for advancing in step-by-step manner a row of stem type lamp mounts each comprising a glass stem tube having a flared end and an exhaust tube projecting endwise from the said end, said conveyor mechanism comprising stationary support means, a pair of approximately horizontally disposed stationary slide track rails mounted on said support means and extending parallel to each other in spaced relation and adapted to support and guide the said mounts in upright position thereon for sliding movement therealong with the flared ends of their stem tubes resting on the upper sides of said track rails and their projecting exhaust tubes extending downwardly between and confined by the said track rails, a rotary mount turnover device mounted on said support means for bodily swinging the mounts in a vertical plane to transfer them one at a time from a mount pick-up position located directly beneath the front end of said slide track and place them in an inverted loading position resting on the said front end of the track in readiness for sliding movement therealong, said mount turnover means comprising a rotary head portion rotatable about a horizontal axis parallel to said track and provided with a pair of mount holding jaws, said track being provided at its front end with a side entrance passageway for the exhaust tubes of the mounts, said entrance passageway leading into the longitudinal passageway between said track rails and being aligned with the vertical plane of swinging movement of the mount by said turnover device, actuating means for rotating the rotary head portion of the mount turnover device and operating the said jaws thereof, a horizontally disposed shuttle plate member extending along one side of said slide track, means mounting said shuttle plate member on said support means for intermittent oscillating movement laterally of said track to move into and out of engagement with the mounts thereon and for intermittent reciprocating movement longitudinally of said track to advance the said mounts therealong, said shuttle plate member having a plurality of uniformly spaced mount-receiving notches in its inward longitudinal side edge adapted to receive and confine therein the stem tubes of the mounts on said track upon movement of said shuttle plate member inwardly of the track to its mount-engaging position, and shuttle plate operating means for oscillating and reciprocating said shuttle plate member in proper timed relation to the operation of said mount turnover device to move said shuttle plate member laterally inward of the track into engagement with the mounts thereon while the foremost one of said mounts is still held in place by the jaws of said turnover device and to then move the shuttle plate member forwardly to advance the mounts along the track only after the said jaws are opened to release the foremost mount and are moved to a position clear of the path of advance movement of the said foremost mount along the track by said shuttle plate member.

References Cited in the file of this patent

UNITED STATES PATENTS 2,484,095     Johnson               Oct. 11, 1949